United States Patent
Voser

(10) Patent No.: US 11,519,267 B2
(45) Date of Patent: Dec. 6, 2022

(54) METHOD AND DEVICE FOR EXPANDING A GAS WITH A RECIPROCATING-PISTON MACHINE

(71) Applicant: BURCKHARDT COMPRESSION AG, Winterthur (CH)

(72) Inventor: Alexandre Voser, Elsau (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 371 days.

(21) Appl. No.: 16/630,161

(22) PCT Filed: Jul. 10, 2018

(86) PCT No.: PCT/EP2018/068723
§ 371 (c)(1),
(2) Date: Jan. 10, 2020

(87) PCT Pub. No.: WO2019/011950
PCT Pub. Date: Jan. 17, 2019

(65) Prior Publication Data
US 2020/0166036 A1    May 28, 2020

(30) Foreign Application Priority Data

Jul. 10, 2017  (EP) .................................. 17180429

(51) Int. Cl.
*F01B 25/02*        (2006.01)
*F04C 29/12*        (2006.01)
(Continued)

(52) U.S. Cl.
CPC ................ *F01B 25/02* (2013.01); *F01L 7/06* (2013.01); *F04B 39/08* (2013.01); *F04B 39/10* (2013.01);
(Continued)

(58) Field of Classification Search
CPC ..... F01L 7/00; F01L 7/06; F01B 25/02; F04B 39/10
See application file for complete search history.

(56) References Cited

U.S. PATENT DOCUMENTS

| 2010/0300554 A1 | 12/2010 | Howes et al. |
| 2012/0189467 A1 | 7/2012 | Allenspach et al. |

(Continued)

FOREIGN PATENT DOCUMENTS

| GB | 2482416 A1 | 2/2012 |
| WO | 2009074800 A1 | 6/2009 |
| WO | 2011009880 A1 | 1/2011 |

OTHER PUBLICATIONS

International Search Report for PCT/EP2018/068723, prepared by the EP patent office, dated Oct. 26, 2018, 4 pages including the English Translation.

*Primary Examiner* — Thomas E Lazo
*Assistant Examiner* — Daniel S Collins
(74) *Attorney, Agent, or Firm* — Brooks Kushman P.C.

(57) ABSTRACT

A method for expanding a compressed gas (GD) at a gas pressure (pD) with a reciprocating-piston machine, wherein the reciprocating-piston machine includes a piston that can move to and fro and a working chamber delimited by the movable piston. The method being carried out as follows: the compressed gas (GD) is supplied to the working chamber via an actuatable rotary slide valve, wherein the compressed gas (GD) in the working chamber is expanded in the working chamber.

21 Claims, 8 Drawing Sheets

(51) Int. Cl.
  *F16K 3/08*   (2006.01)
  *F04B 39/08*  (2006.01)
  *F04B 39/10*  (2006.01)
  *F01L 7/06*   (2006.01)
  F04C 21/00    (2006.01)
  F01L 7/00     (2006.01)

(52) U.S. Cl.
  CPC ............ *F04C 29/124* (2013.01); *F16K 3/085* (2013.01); *F01L 7/00* (2013.01); *F04C 21/00* (2013.01)

(56) References Cited

U.S. PATENT DOCUMENTS

| | | |
|---|---|---|
| 2013/0032743 A1 | 2/2013 | Fong et al. |
| 2013/0118344 A1 | 5/2013 | Howes et al. |

METHOD AND DEVICE FOR EXPANDING A GAS WITH A RECIPROCATING-PISTON MACHINE

CROSS-REFERENCE TO RELATED APPLICATION

This application is the U.S. national phase of PCT Application No. PCT/EP2018/068723 filed on Jul. 10, 2018, which claims priority to EP Patent Application No. 17180429.7 filed on Jul. 10, 2017, the disclosures of which are incorporated in their entirety by reference herein.

The invention relates to a method and a device for expanding a gas with a reciprocating-piston machine

PRIOR ART

In reciprocating-piston compressors automatically functioning valves controlled by pressure differentials are predominantly used to compress a fluid by means of a piston capable of moving to and fro in a cylinder. In addition to such automatic valves, the document WO 01/59266A1 discloses a positively controlled rotary slide valve which in combination with a reciprocating-piston compressor, and when suitably actuated, is capable of regulating the quantity of gas compressed by the reciprocating-piston compressor. This rotary slide valve has the disadvantage that the degree of wear during operation is relatively high, and that the operating range of the rotary slide valve and the reciprocating-piston machine operated in conjunction with this is limited.

DESCRIPTION OF THE INVENTION

The object of the invention is to extend the operating range of reciprocating-piston machines.

This object is achieved by a method having the features of claim 1. The dependent claims 2 to 20 relate to further, advantageous steps in the method. The object is further achieved by a device having the features of claim 21. The dependent claims 22 to 23 relate to further, advantageous embodiments.

The object is achieved, in particular, by a method for expanding a compressed gas at a gas pressure with a reciprocating-piston machine, wherein the reciprocating-piston machine comprises a piston capable of moving to and fro and a working chamber delimited by the moveable piston, the compressed gas being delivered to the working chamber via an actuatable rotary slide valve, and the compressed gas present in the working chamber being expanded in the working chamber.

The object is moreover achieved, in particular, method for expanding a compressed gas at a gas pressure with a reciprocating-piston machine, wherein the reciprocating-piston machine comprises a piston capable of moving to and fro, a working chamber delimited by the moveable piston, an actuatable rotary slide valve for delivering the compressed gas into the working chamber and an actuatable second valve for discharging gas from the working chamber, the piston being moved towards a top dead center with the rotary slide valve closed, and the second valve being closed before the top dead center is reached, with the result that a gas residual quantity in the working chamber is compressed by the piston, the rotary slide valve being opened, the compressed gas flowing into the working chamber with the rotary slide valve opened; the piston is moved towards a bottom dead center; the rotary slide valve is closed during the movement of the piston, and the gas present in the working chamber is expanded, the second valve being opened, the expanded gas being expelled from the working chamber via the second valve and by the piston moving towards the top dead center, and the second valve being closed before the piston has reached the top dead center, so that the gas residual quantity present in the working chamber after the second valve has closed is compressed, and the pressure differential prevailing over the rotary slide valve in the area of the top dead center is thereby reduced.

The object is moreover achieved, in particular, by a device for expanding a compressed gas, comprising a reciprocating-piston machine, wherein the reciprocating-piston machine comprises a piston capable of moving to and fro and a working chamber delimited by the moveable piston, and comprising an actuatable rotary slide valve and an actuatable second valve, and comprising an actuating device for actuating the rotary slide valve and the second valve, wherein the compressed gas is delivered to the working chamber via the rotary slide valve, and wherein the compressed gas present in the working chamber can be expanded in the working chamber, wherein the expanded gas present in the working chamber can be discharged via the second valve, wherein the actuating device actively closes the second valve before a top dead center is reached, in order to compress a gas residual quantity present in the working chamber up to the top dead center, and thereby to reduce the pressure differential prevailing on the rotary slide valve in the area of the top dead center.

The method according to the invention allows an expansion of a compressed gas or pressurized gas from a higher pressure level to a lower pressure level using a reciprocating-piston machine, so that the reciprocating-piston machine, which is usually operated as a reciprocating-piston compressor, can be operated as a reciprocating-piston expander. The method according to the invention allows a reciprocating-piston machine that hitherto could only be operated also as a reciprocating-piston compressor to be operated as a reciprocating-piston expander. The method according to the invention for operating the reciprocating-piston machine, and the reciprocating-piston machine according to the invention comprises an actuatable first valve, which is designed as a rotary slide valve, for controlled delivery of the pressurized compressed gas into the working chamber of the reciprocating-piston machine. The compressed gas delivered is then expanded in the working chamber, and the expanded gas is thereafter at least partially expelled from the working chamber. Pressurized valves, such as are used for reciprocating-piston machines or for reciprocating-piston compressors, can usually either not be opened at all, or can be opened only by applying large forces with a corresponding high degree of wear. The method according to the invention allows an expansion of the compressed gas with a reciprocating-piston machine by delivering the compressed gas to the working chamber of the reciprocating-piston machine via the first valve, by then expanding the delivered compressed gas in the working chamber until a bottom dead center is reached and then partially expelling it from the working chamber via an actuatable second valve, and by then closing the second valve and compressing a gas residual quantity remaining in the working chamber of the reciprocating-piston machine, in such a way that the pressure differential prevailing over the first valve in the area of the top dead center of the reciprocating-piston machine is reduced, preferably in such a way that the pressure differential prevailing over the first valve on opening of the first valve presents substantially no differential pressure. This allows the first valve to open in the area of the top dead center of the reciprocating-piston machine, so that the compressed gas can flow into the working chamber of the reciprocating-piston machine, before being expanded in the working chamber and then expelled from the working chamber. The first valve is moreover advantageously opened with little wear.

The invention has the advantage that the reciprocating-piston machine, which could hitherto be operated only as a reciprocating-piston compressor, can now also be operated as a reciprocating-piston expander. A further advantage is that the first valve can be controllably opened despite the prevailing pressure of the compressed gas. The forces required to open the first valve are advantageously not too high, so that the first valve can in particular be controllably opened at very precise times.

In a further, advantageous method the second valve is actuated in such a way that the gas residual quantity remaining in the working chamber of the reciprocating-piston machine is determined in such a way that the gas residual quantity in the working chamber in the area of the top dead center has a pressure which is higher than the pressure of the compressed gas, so that as a result the first valve can be actuated with particular ease. In a particularly advantageous embodiment, the first valve is moreover designed as an automatic valve, in such a way that its closing element lifts off from the valve seat when the pressure in the working chamber is greater than the pressure of the compressed gas. In this case, on opening, the closing element no longer lies against the valve seat, which allows a particularly easy and moreover frictionless, or largely frictionless opening of the closing element. The first valve is advantageously designed as a rotary slide valve so that on opening, after lifting off, the closing element can be rotated preferably without any friction.

The energy released during expansion of the compressed gas in the internal chamber of the cylinder and the energy delivered to the reciprocating-piston machine or the piston during expansion of the compressed gas is advantageously utilized and led off, the reciprocating-piston machine by way of a piston-driven shaft, for example, driving an electric generator, in order to generate electrical energy.

In a particularly advantageous embodiment the same reciprocating-piston machine can be actuated according to requirements to operate as a reciprocating-piston compressor or as a reciprocating-piston expander, so that either a gas is compressed to form a compressed gas, or a pressurized compressed gas is expanded, wherein through a corresponding actuation of the reciprocating-piston machine or its valves the reciprocating-piston machine either compresses the gas or expands the compressed gas. Such a reciprocating-piston machine is suited, for example, to the charging and discharging of a gas reservoir.

It is particularly advantageous if both the first valve and the second valve are designed as slide valves, advantageously as linearly moveable slide valves and particularly advantageously as rotatably moveable rotary slide valves. In a further embodiment the first valve could be designed as a slide valve, whereas the second valve comprises a lifting tappet for actuatable closing of the second valve.

In an advantageous method the reciprocating-piston machine may also be run in partial-load operation, in which only a partial quantity of the maximum possible quantity of gas is expanded and/or compressed in the working chamber.

In a particularly advantageous embodiment, the reciprocating-piston machine is designed as a double-acting reciprocating-piston machine comprising two working chambers acting in opposition. In an advantageous method the double-acting reciprocating-piston machine is operated in such a way that the first working chamber is used as expansion chamber in order to expand a compressed gas, and the second working chamber is used as compression chamber in order to compress a gas. Both the first and the second working chamber preferably each comprise an actuatable first valve and an actuatable second valve. It is therefore possible to actuate the first and second valves of the two working chambers independently of one another, and consequently to control the compression or the expansion in each working chamber individually. It is therefore possible, for example, to expand a maximum possible quantity of compressed gas via the first working chamber, and via the second working chamber to compress only a partial quantity of the maximum possible quantity of gas. It is likewise possible to operate both the first working chamber and the second working chamber in a partial-load operation. Advantageous applications of the reciprocating-piston compressor according to the invention are refrigerating machines or heat pumps.

In a further, advantageous embodiment the reciprocating-piston machine comprises a plurality of single-acting and/or double-acting pistons having corresponding working chambers, in which gases are compressed and/or expanded. In particular, a piston compressor may comprise both cylinders in which a compression takes place, and cylinders in which an expansion takes place. It is moreover possible, depending on the requirements, for either compression or expansion to be performed in cylinders. The piston compressor preferably comprises a common crankshaft, wherein at least some of the pistons, each assigned to a cylinder, are connected to the crankshaft in order that the pistons, in compressing the gas, derive energy from the crankshaft, and the pistons thereby deliver energy to the crankshaft during the expansion of the gas.

The invention is explained in detail below on the basis of exemplary embodiments.

BRIEF DESCRIPTION OF THE FIGURES IN THE DRAWING

In the figures of the drawing used to explain the exemplary embodiments:

FIG. 1a schematically shows a reciprocating-piston machine with a piston in the bottom dead center position;

FIG. 1b schematically shows a reciprocating-piston machine with the piston in the top dead center position;

FIG. 2 schematically shows a reciprocating-piston machine with a double-acting piston;

Figure 17:
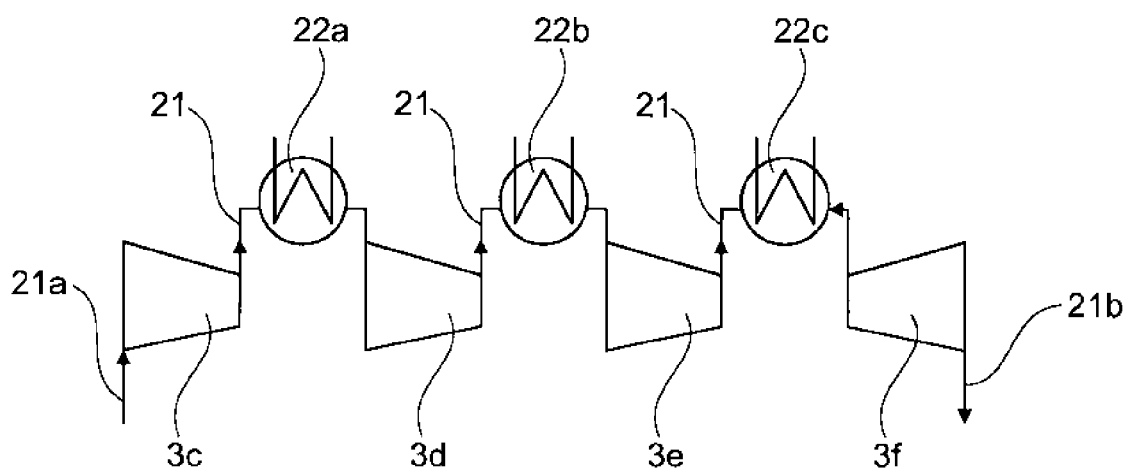

FIG. 17 schematically shows an arrangement for processing a fluid.

In the figures of the drawing, identical parts are basically provided with the same reference numerals.

EMBODIMENTS OF THE INVENTION

Figure 1A:
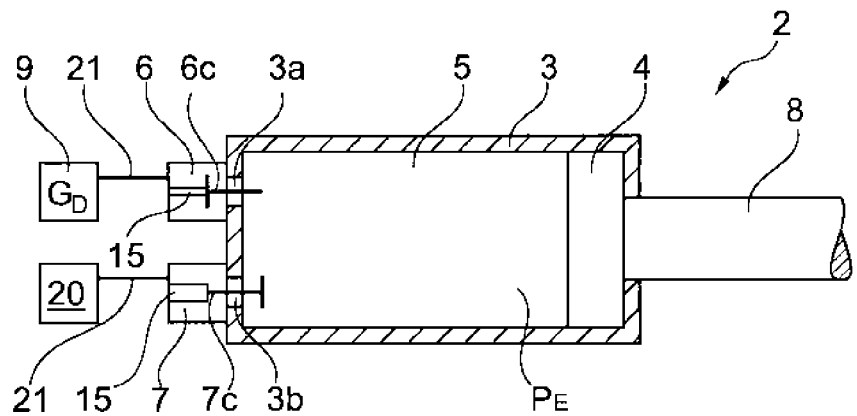

FIG. 1a shows a reciprocating-piston machine 2 comprising a cylinder 3 and a piston 4 capable of moving to and fro therein, wherein the cylinder 3 and the piston 4 delimit a internal chamber 5, wherein the internal chamber 5 is connected to a pressure reservoir 9 via a first valve 6, designed as a rotary slide valve, and a line 21, and wherein the internal chamber 5 has a fluid-carrying connection via a second valve 7 and a line 21 to a space 20, for example an exterior such as the atmosphere at pressure $p_A$, which has a lower pressure than the gas pressure $p_D$ of the gas $G_D$ in the pressure reservoir 9. The piston 4 is connected by a piston rod 8 to a drive (not represented). FIG. 1a shows the piston 4 in the position of a bottom dead center $P_1$, that is to say with the largest possible internal chamber 5, having a volume $V_{UTP}$. On its end face the cylinder 3 comprises ducts 3a, 3b, which form a fluid-carrying connection to the valves 6, 7. The first valve 6 is designed as a delivery valve 6c, and the second valve 7 is designed as a suction valve 7c. The delivery valve 6c and the suction valve 7c can be moveably driven in a longitudinal direction by means of a linear drive 15, represented only schematically. The reciprocating-piston machine 2 represented in FIGS. 1a and 1b can be operated as a reciprocating-piston compressor or as a reciprocating-piston expander, depending on the actuation of the valves 6 and 7. In order to operate the reciprocating-piston machine 2 represented in FIG. 1a as a reciprocating-piston compressor, the delivery valve 6c and the suction valve 7c could be operated automatically, for example by dispensing with the linear drive 15 or operating this in an idling mode, and by drawing in the gas to be compressed from the atmosphere, for example, via the suction valve 7c, and by delivering the compressed gas to the pressure reservoir 9 via the delivery valve 6c. In order to operate the reciprocating-piston machine 2 represented in FIG. 1a as a reciprocating-piston expander, the first valve 6 and the second valve 7 must be controllably operated by controlling the delivery valve 6c and the suction valve 7c so that they are opened and closed each by their schematically represented drive 15. In FIG. 1a the drives 15 produce a linear motion of the delivery valve 6c and the suction valve 7c respectively, in order to either lift a closing element off from a valve seat or press it against the latter.

Figure 1B:
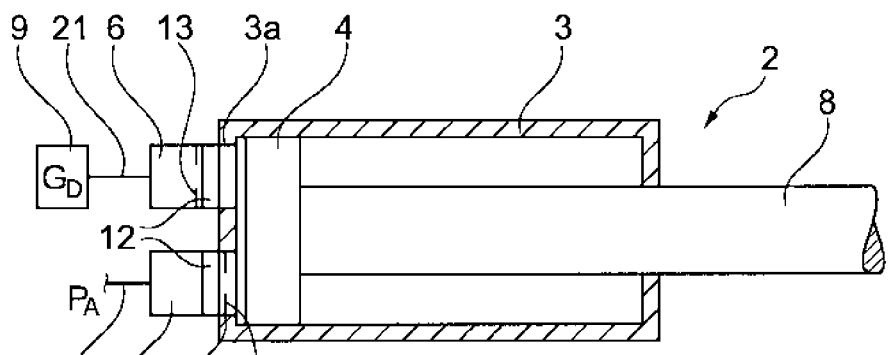

FIG. 1b shows a reciprocating-piston machine 2 with a position of the piston 4 at the top dead center $P_3$, that is to say the smallest possible internal chamber 5, having a volume $V_{OTP}$. The volume $V_{OTP}$ of the internal chamber 5 still remaining at the top dead center $P_3$ is usually referred to as dead-volume space, dead space or as residual gas. In the exemplary embodiments according to FIG. 1b and FIG. 2, the first valve 6 and the second valve 7 are represented schematically, these valves 6, 7 being designed as rotary slide valves. FIG. 1b shows the first valve 6 and the second valve 7 each with a valve seat 12 and a rotatably arranged closing element 13. Details of an exemplary embodiment of such a rotary slide valve are described in the succeeding FIGS. 7 to 13.

Figure 2:
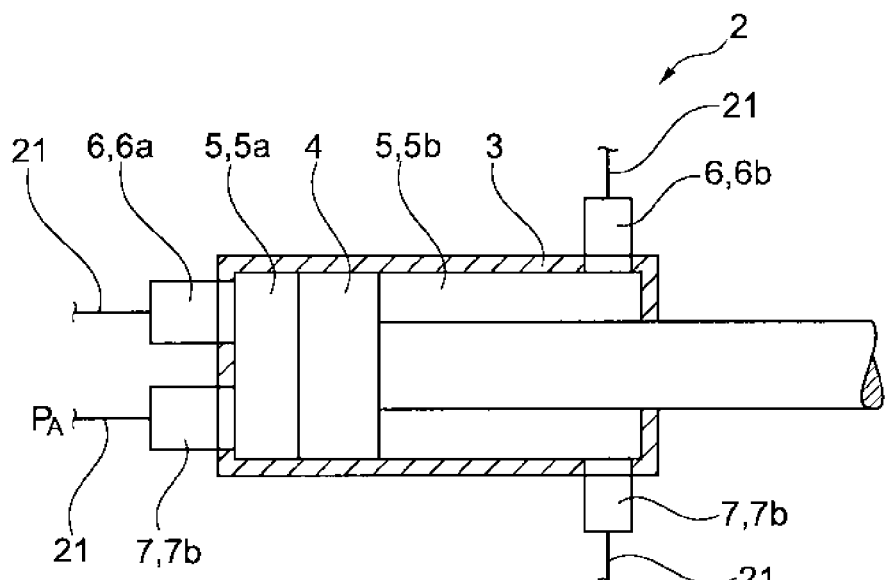

FIG. 2 shows a reciprocating-piston machine 2 having a double-acting piston 4, the latter dividing the internal chamber 5 into a first internal chamber 5 and a second internal chamber 5b. Each internal chamber 5a, 5b has a fluid-carrying connection, via a corresponding first valve 6, 6a, 6b designed as rotary slide valve and a corresponding second valve 7, 7a, 7b and via fluid lines 21, to chambers not represented in detail. The valves 6, 7 are preferably designed as rotary slide valves.

Figure 3:
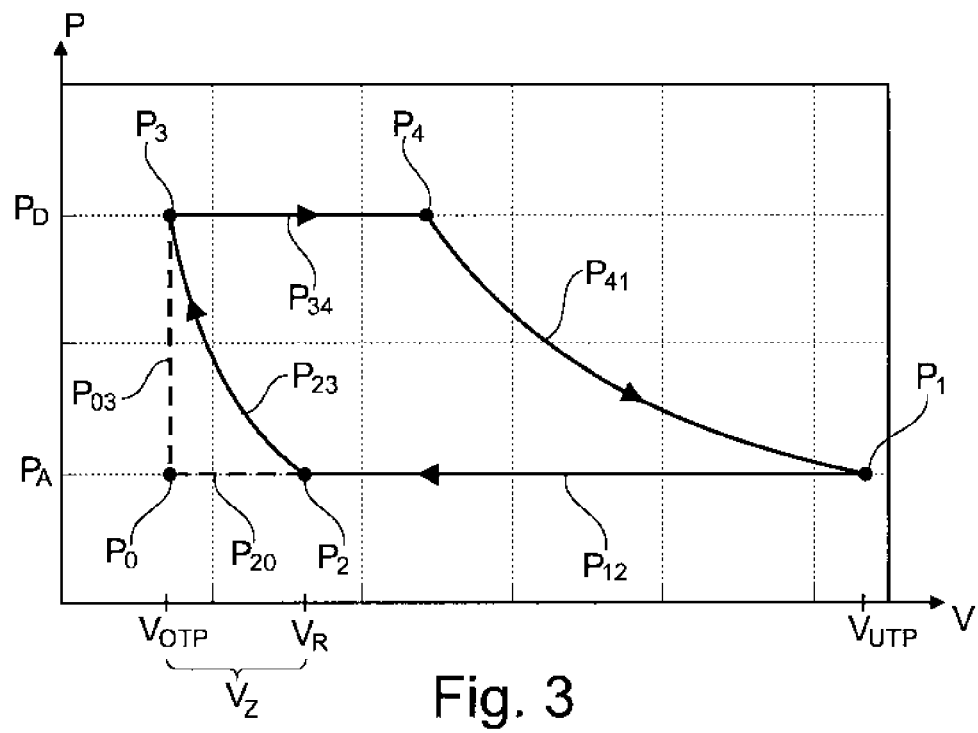
FIG. 3 shows a P-V diagram of a reciprocating-piston machine during an expansion operation.

FIG. 3 shows two P-V diagrams (P=pressure, V=volume) of a reciprocating-piston machine 2 during an expansion operation, these P-V diagrams being explained with the aid of the reciprocating-piston machine 2 comprising rotary slide valves according to FIG. 1b. In the expansion operation, the first valve 6 is operated as inlet valve and the second valve 7 as outlet valve, for which reason the point $P_2$ is referred to as second valve closing angle $P_2$ or as outlet valve closing angle $P_2$, and the point $P_4$ as first valve closing angle $P_4$ or as inlet valve closing angle $P_4$. In FIG. 3 the abscissa V shows the magnitude of the internal volume of the internal chamber 5, the bottom dead center volume $V_{UTP}$ being represented, in particular, at the bottom dead center $P_1$ and the top dead center volume $V_{OTP}$ at the top dead center $P_3$. The ordinate P shows the pressure of the gas in the internal chamber 5.

The diagram represented in FIG. 3 and referred to as the first P-V diagram comprises the points $P_1$, $P_0$, $P_3$ and $P_4$, or the polygonal chain connecting these points, or this cyclical process. The first valve 6 is preferably opened at the top dead center $P_3$, so that the compressed gas $G_D$ under pressure in the pressure reservoir 9 flows into the internal chamber 5 and the piston 4 is displaced along the line $P_{34}$ to the point $P_4$, from which point $P_4$ the first valve 6 can be actuated, and is preferably positively closed. The piston 4 moves further to the right, so that the gas present in the internal chamber 5 is expanded along the line $P_{41}$ to the bottom dead center $P_1$, at which the second valve 7 can be controllably opened, for example, to the atmospheric pressure $p_A$. With the second valve 7 opened, the piston 4 then moves to the left to the point $P_0$, at which the second valve 7 can be actuated to close it. The cyclical process follows the line $P_{03}$, the first valve being positively opened at the point $P_3$, that is to say being actuatable in order to positively open it so that the compressed gas $G_D$ flows into the internal chamber 5, as already described. The term "positively" is taken to mean that the valve is forcibly opened or closed by mechanical forces deriving from a drive, without the support of differential pressure prevailing by way of the valve, that is to say any pressure differential.

A disadvantage on this first P-V diagram is that on opening of the first valve 6 a large pressure differential prevails over the first valve 6, since the gas pressure in the internal chamber 5 shortly before opening of the first valve 6 corresponds approximately to the atmospheric pressure $p_A$. Owing to the prevailing pressure differential, the first valve 6 can be opened only with great difficulty, sometimes only with the exertion of considerable force. If the drive 15 generates a sufficiently large force, the first valve 6 can consequently be positively opened, which presents the disadvantage, however, that a considerable degree of wear occurs in the opening of the first valve 6. The positive opening of the first valve 6 has the further disadvantage that the gas pressure in the internal chamber 5 may be relatively low, so that the energy of the gas flowing into the internal chamber 5 is nullified in the valve as valve loss. The pressure differential over the first valve 6 on opening is advantageously as small as possible, in order that the compressed gas flowing into the internal chamber 5 will drive the piston 4, so that the energy contained in the compressed gas can be led off via the movement of the piston 4 or via the reciprocating-piston machine, the reciprocating-piston machine being used, for example, to drive a generator. It is therefore possible to recover the energy contained in the compressed gas during the expansion process.

The diagram represented in FIG. 3 and referred to as the second P-V diagram shows a cyclical process or a method encompassing the points $P_1$, $P_2$, $P_3$ and $P_4$. This method according to the invention for expanding the compressed gas $G_D$ present in the pressure reservoir 9 is performed in that the second valve 7 is already closed before the top dead center $P_3$ is reached, that is at the second valve closing angle $P_2$, so that at the point $P_2$ a gas residual quantity $G_R$ or a gas residual volume $V_R$ at the pressure $P_A$ is still present in the working chamber 5.

A reciprocating-piston machine is known to have a dead volume, also referred to as a dead-volume space, so that, for example, if the piston is situated in the position of the top dead center $P_3$ there is still a top dead center volume $T_{OTP}$ in dead spaces such as the cylinder internal chamber and in the valves having a fluid-carrying connection to the cylinder internal chamber. At the expansion pressure $P_A$, the gas residual quantity $G_R$ or the gas residual volume $V_R$ comprises the quantity of gas in the dead center volume $V_{OTP}$ and moreover comprises an additional volume $V_Z$ or the additional gas quantity $G_Z$ corresponding to the additional volume $V_Z$. The weight of the gas residual quantity $G_R$ is retained during the compression from the expansion pressure $P_A$ to the gas pressure at the top dead center $P_3$, whereas the volume of the gas residual quantity $G_R$ at the top dead center $P_3$ corresponds to the dead center volume $V_{OTP}$. In the compression to the point $P_3$ the weight of the gas residual quantity $G_R$ is therefore retained, whereas the gas residual volume $V_R$ present at the point $P_2$ at the pressure $P_A$ is reduced due to the rising pressure. At the pressure $P_A$, this gas residual quantity $G_R$ or its gas residual volume $V_R$, as shown in FIG. 3, comprises the volume $V_{OTP}$ and the additional volume $V_Z$, the additional volume $V_Z$, as represented in FIG. 3, corresponding to the volumetric difference between the points $P_2$ and $P_0$ at the pressure $P_A$. The additional volume $V_Z$ corresponds to an additional quantity of gas, the weight of the additional quantity of gas or the weight of the gas residual quantity $G_R$ remaining constant in the compression from point $P_2$ to $P_3$, whilst the gas residual volume $V_R$ of the gas residual quantity $G_R$ at the top dead center $P_3$ is reduced to the volume $V_{OTP}$. The result of this compression of the gas residual quantity $G_R$ is that at the top dead center $P_3$ the pressure differential prevailing over the first valve 6 is reduced. The first valve 6 is preferably controllably opened in the area of the top dead center $P_3$, so that the compressed gas $G_D$ flows into the working chamber 5 when the first valve 6 is opened, the piston 4, on reaching the top dead center, moving back in the direction of the bottom dead center, that is to say to the right in the representation according to FIG. 3. The first valve 6 is then again controllably closed at the first valve closing angle $P_4$, and the gas present in the working chamber 5 is expanded along the curve $P_{41}$ until the second valve 7 is opened in the area of the bottom dead center $P_1$. The piston 4 then moves back towards the top dead center, to the left in the representation according to FIG. 3, the gas present in the working chambers being expelled via the second valve 7 until the second valve 7 is controllably closed again at the second valve closing angle $P_2$. Where it is described herein that the first valve 6 is controllably opened in the area of the top dead center $P_3$, and the second valve 7 is controllably opened in the area of the bottom dead center $P_1$, the term "area" is taken to mean a crankshaft angle range of +/-a predefined angle, for example +/-10° and preferably +/-5° relative to the top dead center $P_3$ or the bottom dead center $P_1$ respectively. The method according to the invention therefore does not demand that the first or second valve 6, 7 be controllably opened precisely at the top dead center $P_3$ or at the bottom dead center $P_1$. It is sufficient if the first or the second valve 6, 7 is opened in the area of these dead centers, for example in a range of +/-5° about these dead centers. The crankshaft angle is predefined by the rotation of the drive of the reciprocating-piston machine 2, the top dead center $P_3$ of the piston 4 corresponding to a crankshaft angle of 0° or 360° and the bottom dead center $P_1$ of the piston 4 to a crankshaft angle of 180°. Since in opening and closing the first valve 6 and the second valve 7 are preferably controlled by the drive means 15, the effective angle at which the valve 6, 7 is opened or closed can be determined or predefined by the actuating device 100. Depending on process parameters of the reciprocating-piston machine, such as the speed of rotation of the main shaft, for example, the reaction time of the valves 6, 7, automatic lifting of the rotary valve etc., it may prove advantageous for the first valve 6 to be controllably opened shortly before reaching the top dead center $P_3$, at the top dead center $P_3$, or shortly after reaching the top dead center $P_3$, or it may prove advantageous for the second valve 7 to be controllably opened shortly before reaching the bottom dead center $P_1$, at the bottom dead center $P_1$, or shortly after reaching the bottom dead center $P_1$.

Figure 7:
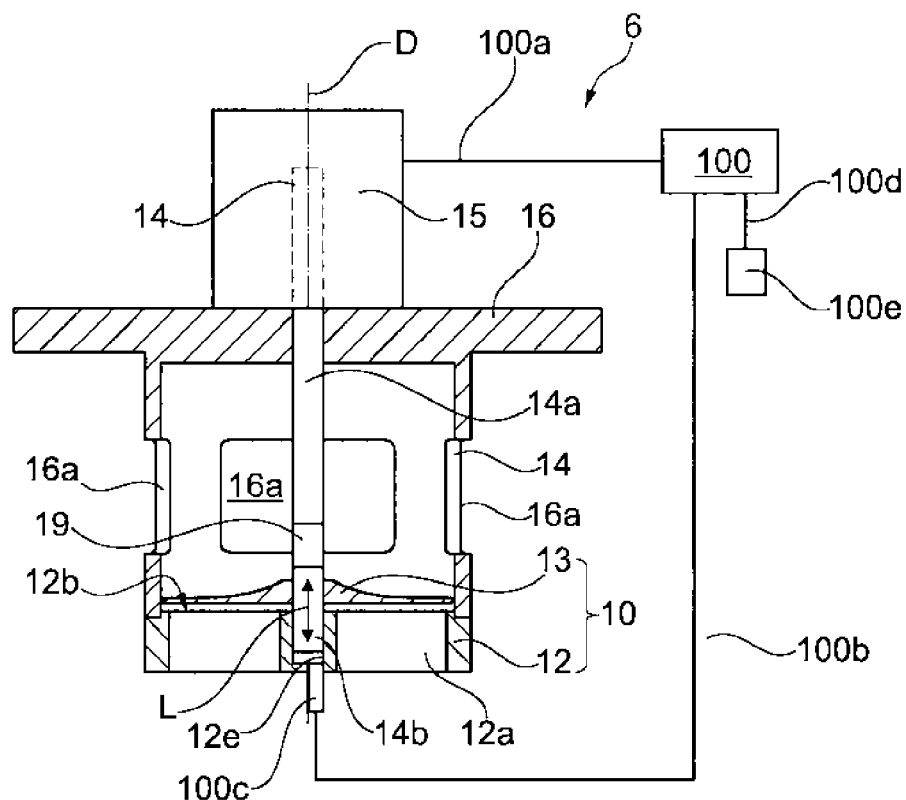
FIG. 7 shows an actuatable first valve designed as a rotary slide valve.

The first valve 6 and the second valve 7 are preferably designed as rotary slide valves 10, the rotary slide valve 10 having the facility for controlled opening and controlled closing through a rotation of a closing element 13. Such an exemplary embodiment of an actuatable first valve 6 is represented in FIG. 7, and an exemplary embodiment of an actuatable second valve 7 in FIG. 8.

The pressure in the internal chamber 5 at the top dead center $P_3$, and thereby the pressure differential prevailing over the first valve 6 as it opens, is determined by the volume and the pressure of the gas residual quantity GR at the point $P_2$, at which the second valve 7 is closed, and by the subsequent compression, caused by the movement of the piston 4 from the point $P_2$ to the top dead center $P_3$.

In the method according to the invention a gas residual quantity $G_R$ in the working chamber 5 is compressed with the first valve 6 closed, and the first valve 6 is then opened, the compressed gas $G_D$ flowing into the working chamber 5 when the first valve 6 is opened and the first valve then being closed, the gas present in the working chamber 5 then being expanded, the expanded gas being expelled from the working chamber 5 via the second valve 7, and the second valve 7 being closed before a top dead center $P_3$ of the reciprocating-piston machine 2 is reached, so that the gas residual quantity $G_R$ present in the working chamber 5 after the closing of the second valve 7 is compressed.

The second valve 7 is advantageously opened in the area of the bottom dead center $P_1$, preferably at 180°, and the expanded gas is then partially expelled from the working chamber 5 via the second valve 7, the second valve 7 being closed at a second valve closing angle $P_2$ at which the gas residual quantity $G_R$ is present in the working chamber 5, the gas residual quantity $G_R$ then being compressed in the working chamber 5, the differential pressure DD prevailing over the closed, first valve 6 in the area of the top dead center $P_3$ being determined through at least one of the parameters: second valve closing angle $P_2$ and gas residual quantity $G_R$. This differential pressure DD prevails on the first valve 6 immediately after the opening of the first valve 6 in the area of the top dead center $P_3$, this differential pressure $D_D$ varying due to the compressed gas $G_D$ then flowing into the working chamber 5.

The second valve closing angle $P_2$ is advantageously predefined in such a way that the gas residual quantity $G_R$ in the area of the top dead center $P_3$ substantially has the pressure $p_D$ of the compressed gas $G_D$, so that the first valve 6 can be opened in the area of the top dead center $P_3$ substantially or entirely without any differential pressure.

It may also prove advantageous for the gas residual quantity $G_R$ and/or the second valve closing angle $P_2$ to be selected in such away that the working chamber 5 has a gas pressure in the area of the top dead center $P_3$ which exceeds the pressure $p_D$ of the compressed gas $G_D$, so that the first valve 6 is particularly easy to open.

In a further, advantageous method the first valve 6 is closed after the top dead center $P_3$ at a first valve closing angle $P_4$ at which a gas expansion quantity GE is present in the working chamber 5, the gas expansion quantity GE then being expanded in the working chamber 5, so that the gas has an expansion gas pressure $P_E$ in the area of the bottom dead center $P_1$, the expansion gas pressure $P_E$ prevailing in the working chamber 5 in the area of the bottom dead center $P_1$ with the second valve 7 closed being determined through at least one of the parameters: first valve closing angle $P_4$ and gas expansion quantity $G_E$.

In a further advantageous method the first valve closing angle $P_4$ is predefined in such a way that the gas expansion quantity $G_E$ in the area of the bottom dead center $P_1$ has an expansion gas pressure $p_E$ which substantially corresponds to the prevailing outlet pressure $p_A$ of the second valve 7, for example the atmospheric pressure, so that the pressure differential prevailing on the second valve 7 is minimized, and the second valve 7 is advantageously opened substantially without any differential pressure.

Figure 14:
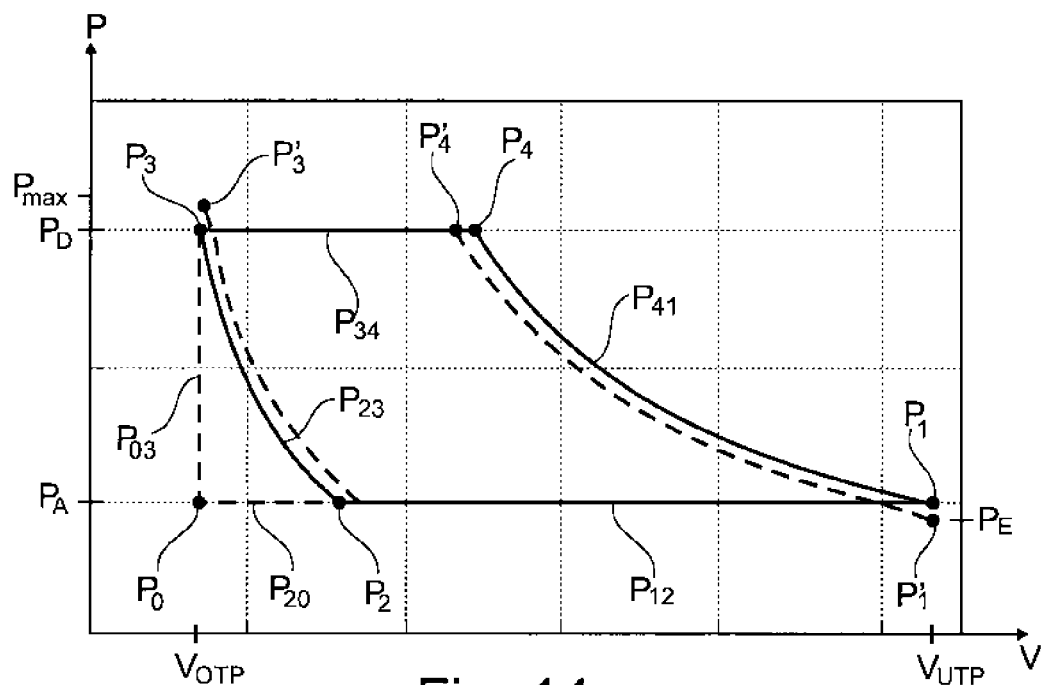
FIG. 14 shows a P-V diagram of the reciprocating-piston machine during a third variant of a partial-load expansion operation.

In a further advantageous method, as represented in FIG. 14, the second valve 7 is closed slightly prematurely and the second valve closing angle $P'_2$ is selected in such a way that the gas residual quantity $G_R$ in the working chamber 5 in the area of the top dead center $P'_3$ with the first valve 6 closed has a gas pressure $p_{max}$ which exceeds the gas pressure $p_D$ of the compressed gas $G_D$.

In a further advantageous method, as represented in FIG. 14, the first valve 6 is closed slightly prematurely and the first valve closing angle $P'_4$ is selected in such a way that with the second valve 7 closed the gas expansion quantity $G_E$ in the area of the top dead center $P'_1$ has an expansion gas pressure $p_E$ which is less than the outlet pressure $p_A$ of the valve 7.

The first valve 6 and/or the second valve 7 advantageously comprises a valve seat 12 having a port 12a and a closing element 13 for closing the port 12a, the closing element 13 of the first valve 6 being automatically lifted relative to the valve seat 12 in the area of the top dead center $P_3$, due to the gas pressure of the gas residual quantity $G_R$, and/or that the closing element 13 of the second valve 7 is automatically lifted relative to the valve seat 12 in the area of the bottom dead center $P_1$, due to the gas pressure of the gas expansion quantity $G_E$. This automatic lifting is not yet termed an opening of the valve, since the closing element 13 is lifted only slightly, preferably in the order of less than on millimeter, and consequently only a negligibly small gas flow occurs through the valve, if any. After automatically lifting from the valve seat 12, the closing element 13 of the first and/or second valve 6, 7 is controllably moved away from the port 12a, in order to expose and thereby open the latter. The closing element 13 is preferably removed or moved through a rotational movement in such a way that the port 12a of the valve is exposed, although this movement could also ensue through a linear movement.

The first valve 6 and/or the second valve 7 advantageously comprise a valve seat 12 having a port 12a and a closing element 13 for closing the port 12a, the first valve 6 and/or the second valve 7 being designed as a rotary slide valve, and the passage 12a being opened and closed through a rotation of the closing element 13.

In a further possible embodiment, the first and/or second valve 6, 7 may also be designed in such a way that the closing element 13 is not moveable perpendicularly to the valve seat 12, so that automatic lifting of the closing element 13 is not possible. In this embodiment the closing element 13 is coupled to a drive 15, which is powerful enough to positively open and positively close the closing element 13 of the first valve and/or the second valve 7.

In a further, advantageous method a process parameter setting $V_S$ of the first valve 6 is predefined, for example the pressure in the internal chamber 5 in the area of the top dead center $P_3$. To do this an outlet valve closing angle actual value $P_{2I}$ of the second valve 7 is varied during successive lift cycles and a process parameter actual value $V_I$ of the first valve 6 is measured as a function of the outlet valve closing angle actual value $P_{2I}$, the outlet valve closing angle actual value $P_{2I}$ at which the process parameter actual value $V_I$ lies closest to the process parameter setting $V_S$ being determined as the outlet valve set closing angle $P_{2Soll}$. In subsequent continuous operation of the reciprocating-piston machine 2 the second valve 7 is then controllably closed at the outlet valve set closing angle $P_{2Soll}$. The pressure occurring in the internal chamber 5 in the area of the top dead center $P_3$, for example, can therefore be predetermined or set. This method can similarly be used in order to predefine a process parameter setting $V_S$ of the second valve 7, for example the pressure in the internal chamber 5 in the area of the bottom dead center $P_1$.

In a further possible method the compressed gas $G_D$ is expanded by at least two reciprocating-piston machines 2 connected in series, by expanding the compressed gas $G_D$ at pressure $p_D$ to a first expansion gas pressure $P_{E1}$ in a first reciprocating-piston machine, and by expanding the gas at the expansion gas pressure $P_{E1}$ to a second expansion gas pressure $P_{E2}$ in a succeeding, second reciprocating-piston machine.

Figure 4:
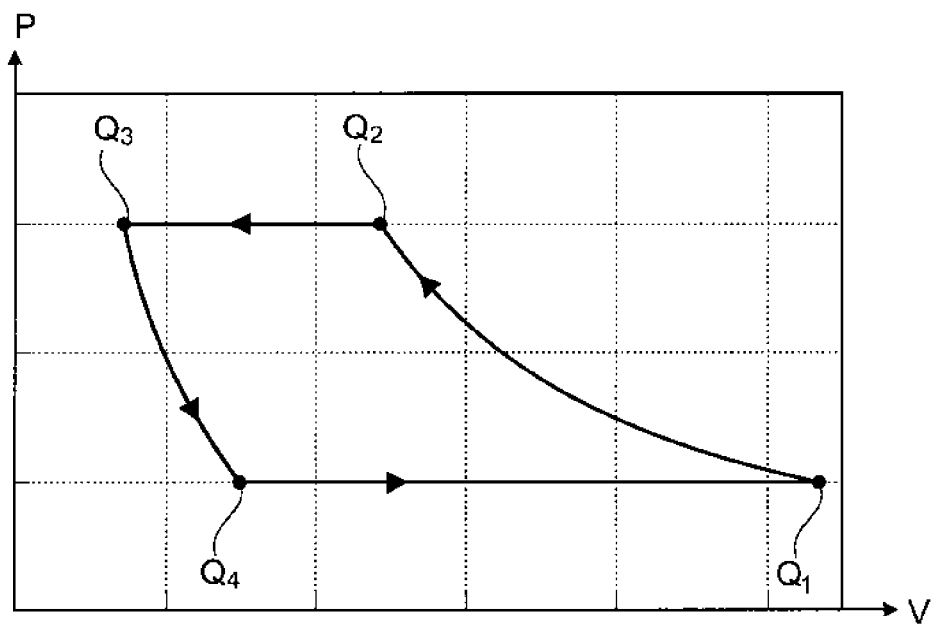
FIG. 4 shows a P-V diagram of a reciprocating-piston machine during a compression operation.

FIG. 4 shows a P-V diagram, known in the art, or a cyclical process of a reciprocating-piston machine 2 during a compression operation. Here a piston, starting from the point Q1, the bottom dead center, is moved towards the point Q3, the top dead center, a gas present in the working chamber 5 being drawn in and compressed from the point Q1 to the point Q2, the first valve 6 being opened at the point Q2, and the compressed gas being expelled from the working chamber 5 from the point Q2 to the point Q3, the top dead center. Here the piston, starting from the point Q3, is moved towards the point Q1, the bottom dead center. Starting from the point Q3, the first valve 6 is closed and the second valve 7 is opened at the point Q4, a gas being drawn into the working chamber 5 via the second valve 7 from the point Q4 to the point Q1 and in the process filling the working chamber 5 with gas. At the point Q1 the second valve 7 is closed and the gas is compressed in the working chamber 5.

In the method according to the invention the reciprocating-piston machine 2 may be operated in two different operating modes, that is to say as a reciprocating-piston compressor or as a reciprocating-piston expander, controlled switching between these operating modes being possible, especially by controlled opening and closing of the first and the second valve 6, 7 according to the selected operating mode. The method for expanding and for compressing a gas G by means of the reciprocating-piston machine 2 is performed in such a way that the gas is compressed by the reciprocating-piston machine 2 to form the compressed gas $G_D$ at pressure $p_D$, and/or that the compressed gas $G_D$ at pressure $p_D$ is expanded again. The reciprocating-piston machine 2 is advantageously operated continuously, in such a way that in continuous operation the reciprocating-piston machine 2 is operated as a reciprocating-piston expander or a reciprocating-piston compressor through corresponding actuation of the first valve 6 and the second valve 7, it being possible to switch from the reciprocating-piston expander mode to the reciprocating-piston compressor mode and vice versa through a corresponding actuation of the valves, preferably during continuous operation.

Figure 5:
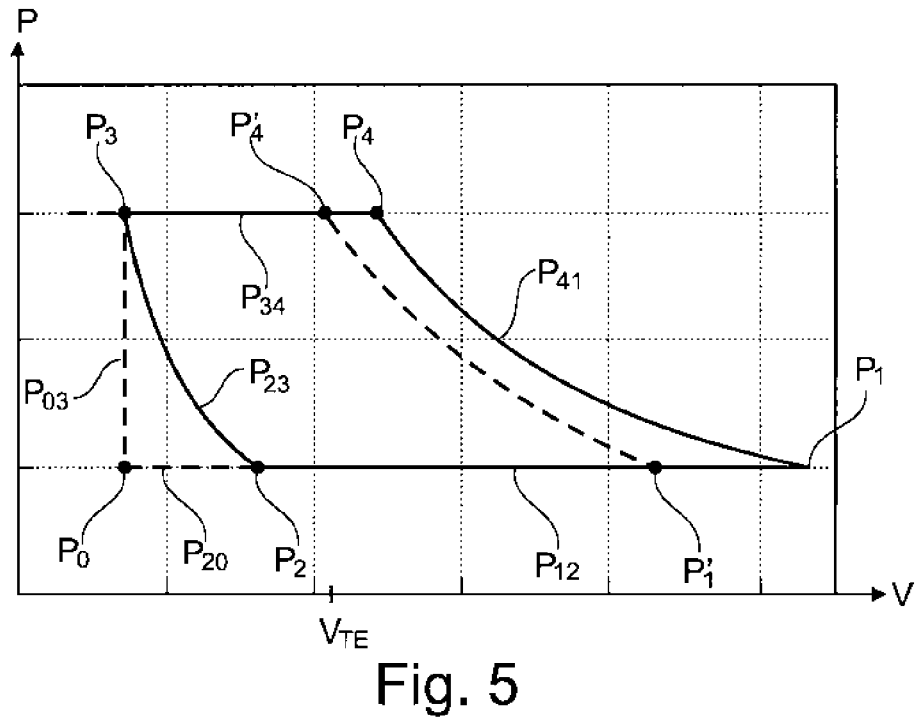
FIG. 5 shows a P-V diagram of the reciprocating-piston machine during a first variant of a partial-load expansion operation.

FIG. 5 in a P-V diagram shows a further, advantageous method, in which the quantity of the gas expanded by the reciprocating-piston expander 2 can be influenced by means of a partial load control. Here the first valve 6 is closed prematurely at a first valve closing angle $P'_4$, at which a partial gas volume $V_{TE}$ or a partial gas expansion quantity $G_{TE}$ is present in the working chamber 5. This partial gas expansion quantity $G_{TE}$ is smaller than the maximum gas expansion quantity $G_{EMAX}$ possible at the point $P_4$. The partial gas expansion quantity $G_{TE}$ is then expanded until the second valve 7 is opened at the working point $P'_1$. Only a partial quantity of the maximum possible gas quantity is therefore expanded.

Figure 6:
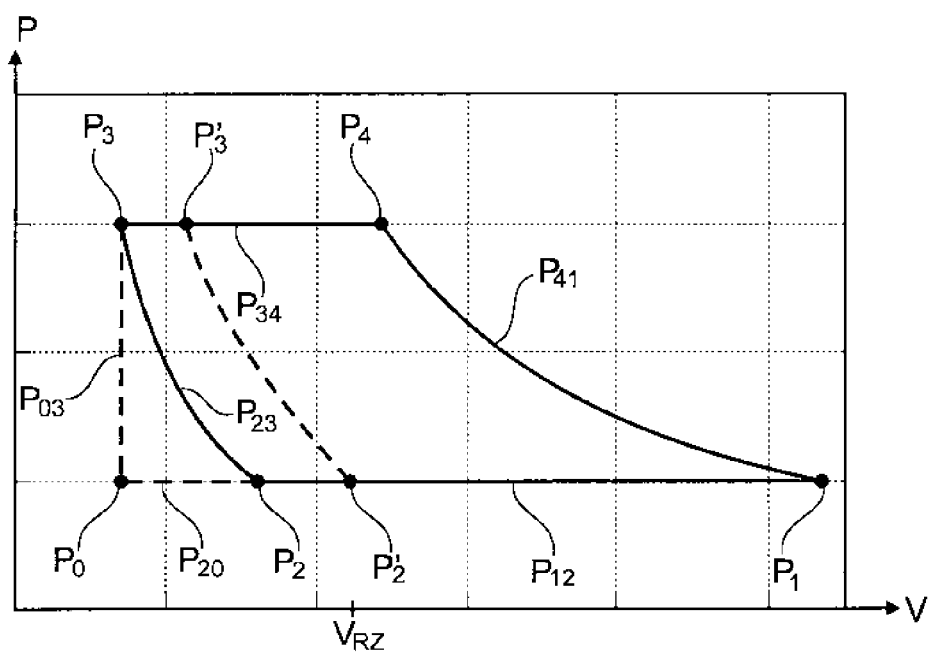
FIG. 6 shows a P-V diagram of the reciprocating-piston machine during a second variant of a partial-load expansion operation.

FIG. 6 in a P-V diagram shows a further, advantageous method, in which the quantity of the gas expanded by the reciprocating-piston expander 2 can be influenced by means of a partial load control. Here the second valve 7 is closed prematurely at a second valve closing angle $P'_2$, at which an excess gas volume $V_{RZ}$ or an excess gas quantity $G_{RZ}$ is present in the working chamber 5. As a result, the gas pressure in the working chamber 5 already exceeds the pressure $p_D$ in the pressure reservoir 9 at the point P3', so that the first valve 6 can be opened, and is preferably automatically or positively opened, and the excess gas quantity $G_{RZ}$ is for the time being forced into the pressure reservoir 9 before, after the top dead center $P_3$, gas can again flow via the first valve 6 into the working chamber 5. It is moreover possible to combine the two methods represented in FIGS. 5 and 6, in order, for example, to expand particularly small gas quantities.

In a further, advantageous method the reciprocating-piston machine 2, as represented in FIG. 2, comprises a double-acting piston 4, which divides the internal chamber 5 into a first internal chamber 5a and a second internal chamber 5b, a first valve 6 and a second valve 7 being assigned to each internal chamber 5a, 5b, and so that simultaneously the gas is compressed to form the compressed gas $G_D$ in the first internal chamber 5a, and the compressed gas $G_D$ is expanded in the second internal chamber 5b. Moreover, different gases could be delivered. Using a partial load control, as disclosed by FIGS. 5 and 6, for example, it is possible to handle different quantities of gas in the first internal chamber 5a and in the second internal chamber 5b, if necessary also at different gas pressures.

FIGS. 7 to 13 show exemplary embodiments of suitable valves and their components for performing the method according to the invention. FIG. 7 in longitudinal section shows a first valve 6 comprising a valve seat 12 having ports 12a, end face 12b and bore 12e, and comprising a closing element 13, rotatable about an axis of rotation D, for opening and closing the ports 12a. The valve seat 12 and the closing element 13 form a rotary slide valve 10. The first valve 6 moreover comprises a yoke 16 having ports 16a, and comprises a drive 15 for turning a shaft 14, which can be directly connected to the closing element 13, in order to drive the latter. In the exemplary embodiment shown the shaft comprises a first shaft part 14a, an elastic coupling 19 in a longitudinal direction L, and a second shaft part 14b. The second shaft part 14b is guided in the bore 12e and is moveable in the longitudinal direction L. This embodiment has the advantage that given corresponding pressure ratios the closing element 13 is able to lift off automatically from the valve seat 12 or can automatically lie against the valve seat 12. A sensor 100c measures the distance from the second shaft part 14b, from which the actuating device 100 is able to determine the distance between the closing element 13 and the end face 12b of the valve seat 12. The actuating device 100 is connected via the line 100b to the sensor 100c, via the line 100a to the operating drive 15, and via the line 100d to a sensor 100e, for example a rotational angle sensor of the crankshaft of the reciprocating-piston machine. Additional sensors and actuators may be provided, which are connected to the actuating device 100, and which measure the process parameters described above, such as the gas pressure $p_D$, for example, or the expansion gas pressure $p_E$, or which actuate the first or second valves 6, 7, for example.

In a further exemplary embodiment, the mobility in a longitudinal direction L might be dispensed with, so that the closing element 13 is only rotatably supported about the axis of rotation D. In this embodiment a rotation of the closing element 13 would mean that the closing element 13 slides along the end face 12b of the valve seat 12.

Figure 8:
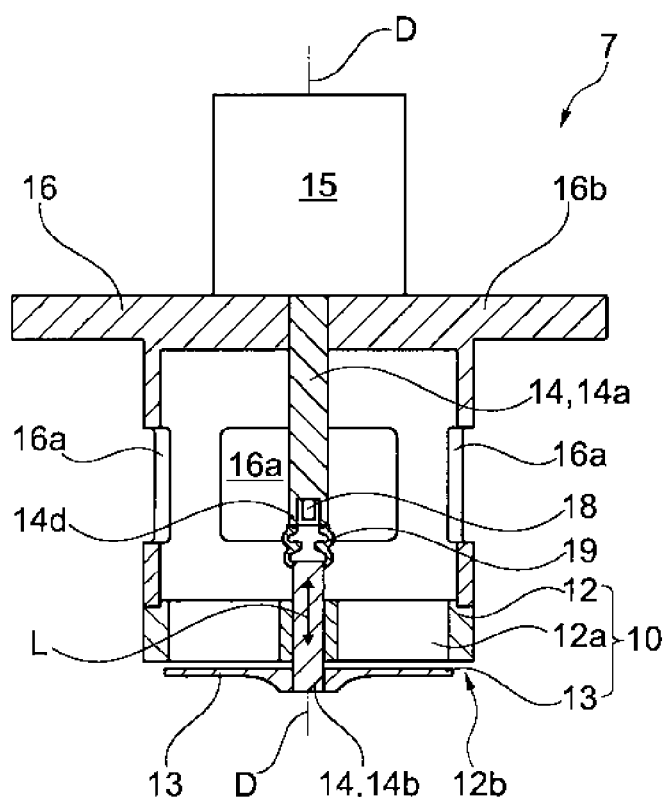
FIG. 8 shows an actuatable second valve.

FIG. 8 in a longitudinal section shows a second valve 7, which is of a design similar to the first valve 6 according to FIG. 7, with the difference that the closing element 13 is arranged on the opposite side of the valve seat. Moreover, the shaft 14 runs right through the valve seat 12. The shaft 14 furthermore comprises a recess 14d, in which a sensor 18 is arranged, and an elastic coupling 19 in a longitudinal direction L, so that the closing element 13 is moveably supported in a longitudinal direction L, the coupling 19 preferably being rigid in response to a rotation about the axis of rotation D. The sensor 18, for example, serves to measure the variation in the distance between the first and the second shaft parts 14a, 14b or the position of the closing element 13 relative to the valve seat 12.

Figure 9:
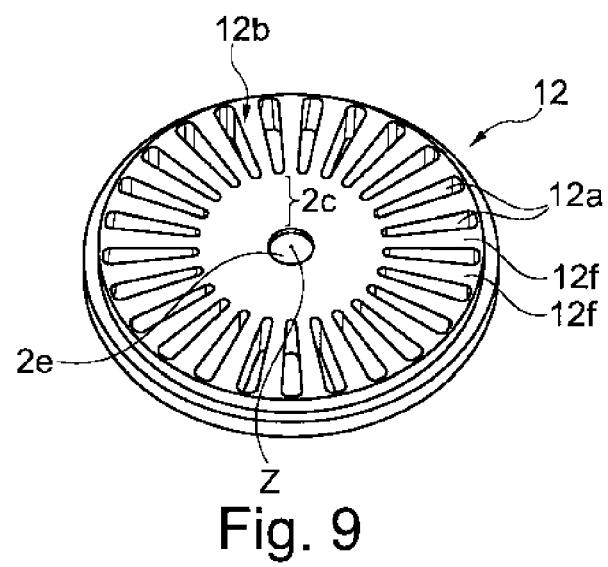
FIG. 9 shows a perspective view of a valve seat.

FIG. 9 shows the valve seat 12 in detail. This comprises a multiplicity of ports 12a and webs 12f, and comprises an end face 12b, an annular seating surface 12c and the bore 12e with center of rotation Z.

Figure 10:
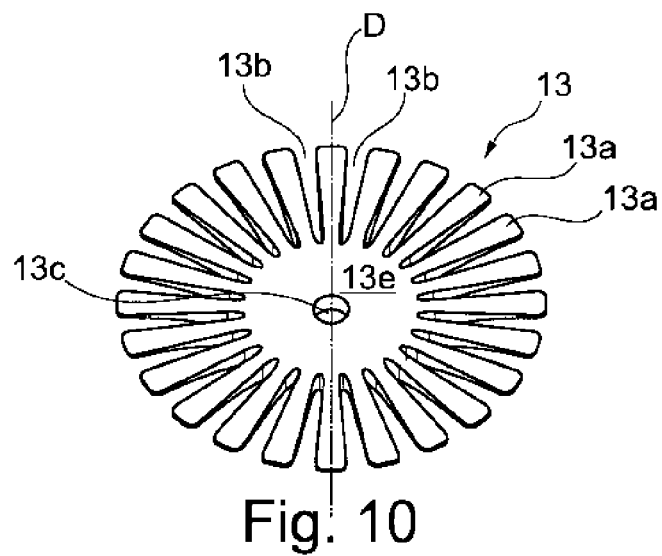
FIG. 10 shows a perspective view of a closing element.
Figure 11:
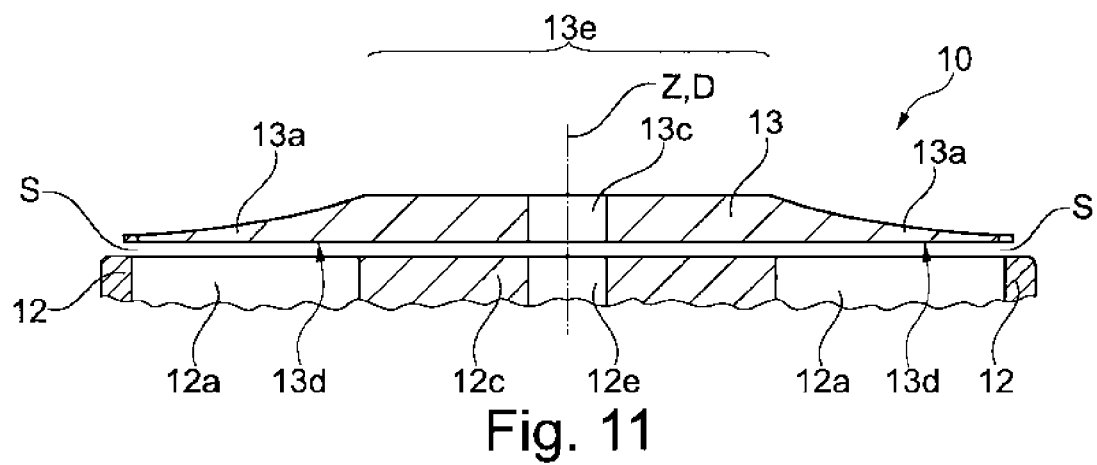
FIG. 11 shows a longitudinal section through a valve shutter.
Figure 12:
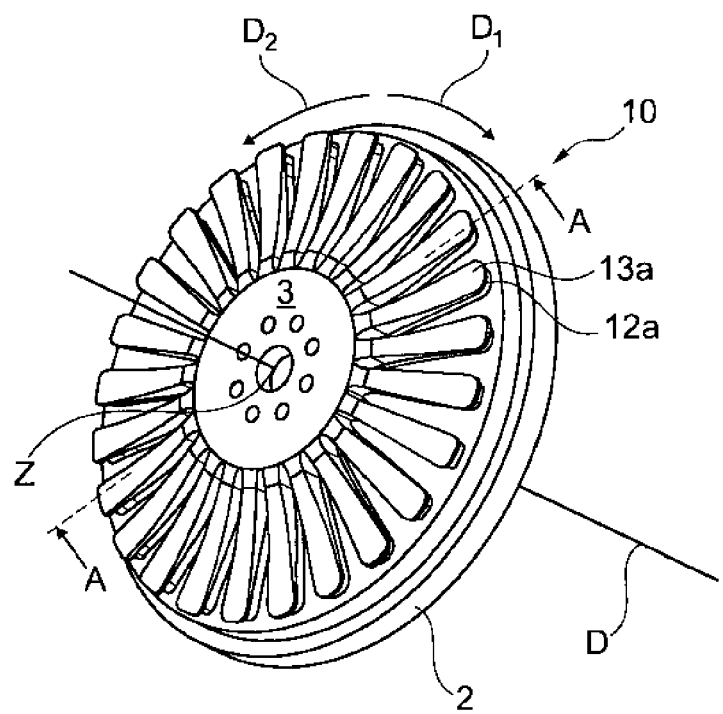
FIG. 12 shows a valve shutter in a lifted closed position.
Figure 13:
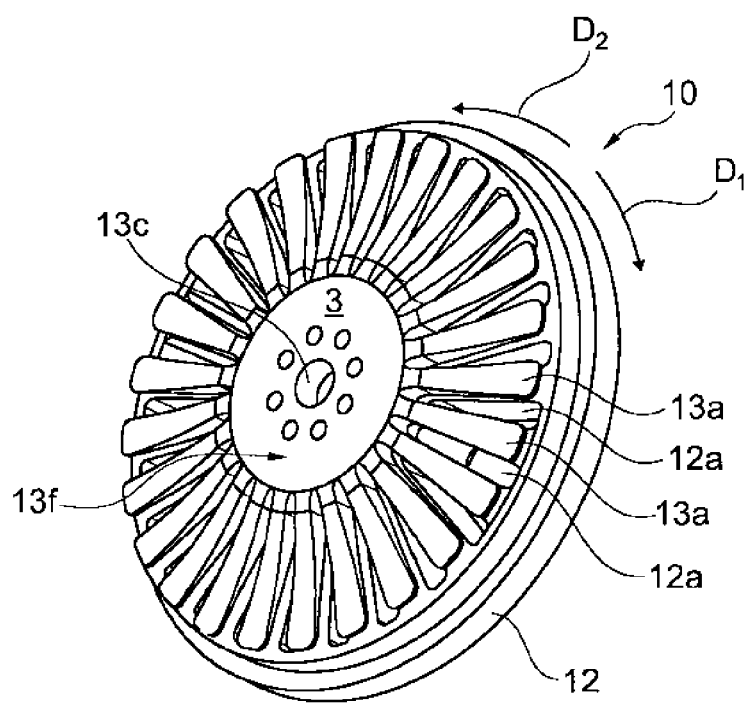
FIG. 13 shows a valve shutter in a lifted open position.

FIG. 10 shows the closing element 13 in detail. This comprises a multiplicity of closing arms 13a and interstices 13b, and comprises a hub 13e and a central bore 13c FIG. 11 in a longitudinal section shows the rotary slide valve 10 represented in FIG. 7 in detail. FIG. 11 moreover shows a longitudinal section through the valve seat 12 according to FIG. 9 and a longitudinal section through the closing element 13 according to FIG. 10. The closing element 13, comprising a sealing face 13*d*, is lifted in relation to the valve seat 12, forming a gap S. The closing element 13 assumes this position in the first valve 6 represented in FIG. 7 when the closing element 13 has been automatically lifted due to the pressures acting on the closing element 13. FIG. 12 shows the rotary slide valve 10 in this position from a perspective view. The section along the line A-A is furthermore shown in FIG. 11. This position is not yet termed opened, since the closing element 13 is only lifted, but the port 12*a* is still covered, and the passage of gas through the gap S is preferably negligibly slight. FIG. 13 shows the closing element 13 lifted in relation to the valve seat 13 in the fully opened position, the closing element 13 having been rotated, compared to the position according to FIG. 12, in the direction of rotation D1, and the port 12*a* is no longer covered and is therefore fully opened. In order to close the rotary slide valve 10 again, the closing element 13 must be rotated in the direction of rotation D2, until the closing elements completely cover the ports 12*a*. The closing element 13 is advantageously rotated whilst in a lifted position, particularly in order to reduce wear. The rotary slide valve 10 may also be designed in such a way, however, that the closing element 13 is not moveable in a longitudinal direction L, so that the closing element 13 always lies against the valve seat 12 and in this position can be turned in the direction of rotation D1 or D2 relative to the valve seat 12, in order to positively open or positively close the rotary slide valve 10 respectively. The closing element is connected to the shaft 14 via the fixing side 13*f*.

FIG. 7 schematically shows the actuation of a reciprocating-piston machine 2. The reciprocating-piston machine 2 according to the invention, as already described in FIGS. 1*a* and 1*b*, comprises a cylinder 3 and a piston 4, which is moveably arranged therein and which in the cylinder 3 delimits a working chamber 5, and which is arranged in the cylinder so that it is moveable to and fro between a bottom dead center $P_1$ and a top dead center $P_3$. The reciprocating-piston machine 2 moreover comprises an actuatable first valve 6 and an actuatable second valve 7, which have fluid-carrying connections to the working chamber 5. The actuating device 100 has a signal-carrying connection to the first valve 6 and to the second valve 7, for example through an electrical line 100*a* for actuating the drive 15, a line 100*b* for registering the position of the closing element 3 relative to the valve seat 12 by means of a sensor 100*c*, or a line 110*d* for registering the crankshaft angle of the reciprocating-piston machine 2 by means of a sensor 100*e*. The actuating device 100 actuates the second valve 7, in such a way that this is already positively closed before the top dead center $P_3$ is reached, that is to say at the point $P_2$ as represented in FIG. 3, in order to seal a gas residual quantity $G_R$ present in the working chamber 5 up to the top dead center $P_3$, and thereby to reduce the pressure differential prevailing on the first valve 6 in the area of the top dead center $P_3$, so that advantageously only a slight pressure differential, if any, is present on the first valve, the pressure in the internal chamber 5, in an especially advantageous embodiment, being higher than in the pressure reservoir 9, so that the closing element 13 is lifted off, preferably automatically, in the area of the top dead center $P_3$.

Figure 15:
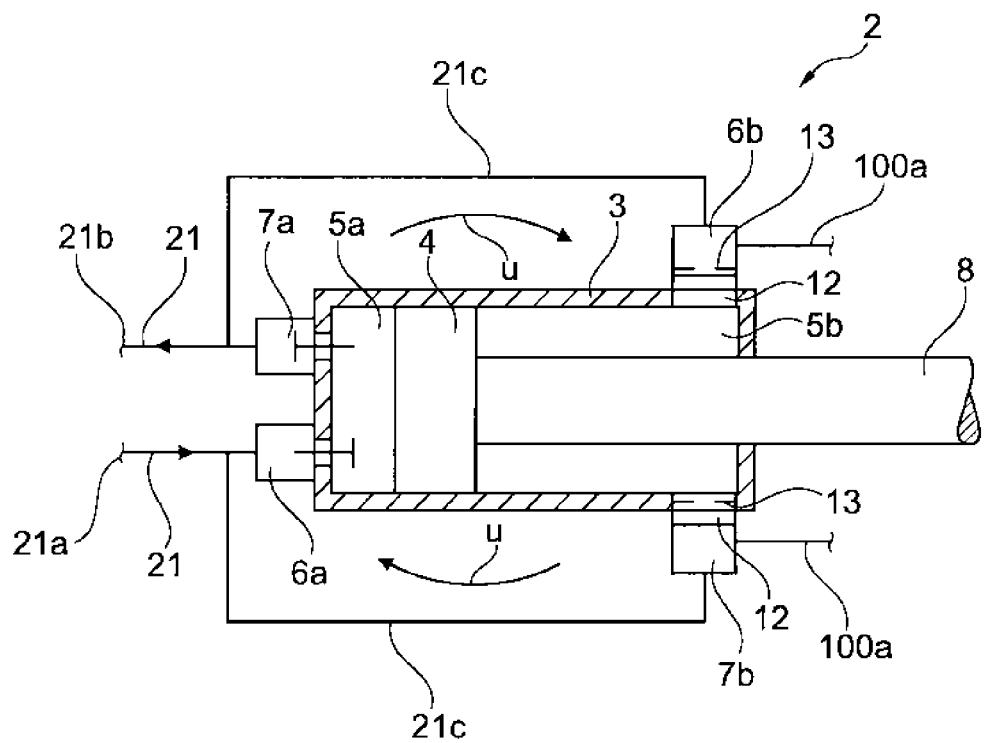
FIG. 15 shows a further exemplary embodiment of a reciprocating-piston machine with valves.

FIG. 15 schematically shows a reciprocating-piston machine 2 comprising a cylinder 3, a double-acting piston 4 and a first internal chamber 5*a* and a second internal chamber 5*b*. A fluid inlet 21 has a fluid-carrying connection via a fluid line 21 and a free-running first valve 6*a* to the first internal chamber 5*a*. The first internal chamber 5*a* has a fluid-carrying connection via a free-running valve 7*a* and a fluid line 21 to the fluid outlet 21*b*. The second valve 7*a* or the fluid line 21 has a fluid-carrying connection via a fluid line 21*c* and via an actuatable rotary slide valve 6*b* to the second internal chamber 5*b*. The second internal chamber 5*b* has a fluid-carrying connection via an actuatable rotary slide valve 7*b* and a fluid line 21*c* to the first valve 6*a* or the fluid line 21. The rotary slide valves 6*b* and 7*b* each comprise a valve seat 12 and a closing element 13, are connected via a signal line 100*a* to an actuating device (not represented). The arrangement represented in FIG. 15 allows the quantity of fluid transported between the inlet 21*a* and the outlet 21*b* to be controlled within a range between 0% and 100%. The quantity of fluid transported is 100% when the actuatable rotary slide valves 6*b*, 7*b* are actuated as if they were free-running valves, the valve 6*b* then being an outlet valve and the valve 7*b* an inlet valve. In order to reduce the quantity of fluid transported, the rotary slide valves 6*b*, 7*b* are actuated in such a way that at least a proportion of the transported fluid is circulated in the fluid direction, some or even all of the fluid emerging via the second valve 7*a* being delivered to the second internal chamber 5*b* via the fluid line 21*c* and the rotary slide valve 6*b*, and the fluid present in the second internal chamber 5*b* being returned to the first internal chamber 5*a* via the rotary slide valve 7*b* and the fluid line 21*c* and the first valve 6*a*. For a % transport, the rotary slide valves 6*b*, 7*b* are actuated in such a way that the entire content of the first internal chamber 5*a* is delivered to the second internal chamber 5*b*, and in that the entire content of the second internal chamber 5*b* then being returned to the first internal chamber 5*a*, so that no fluid or a negligibly small quantity of fluid is transported via the fluid inlet 21*a* and the fluid outlet 21*b*. It is therefore possible, through a corresponding actuation of the rotary slide valves 6*b*, 7*b*, to vary the quantity of fluid transported between the inlet 21*a* and the a the outlet 21*b* in a range from 0% to 100%. The method described by FIG. 15 could naturally also be operated with two single-acting pistons 4, so that two cylinders 3 with pistons 4 would be required for its operation.

Figure 16:
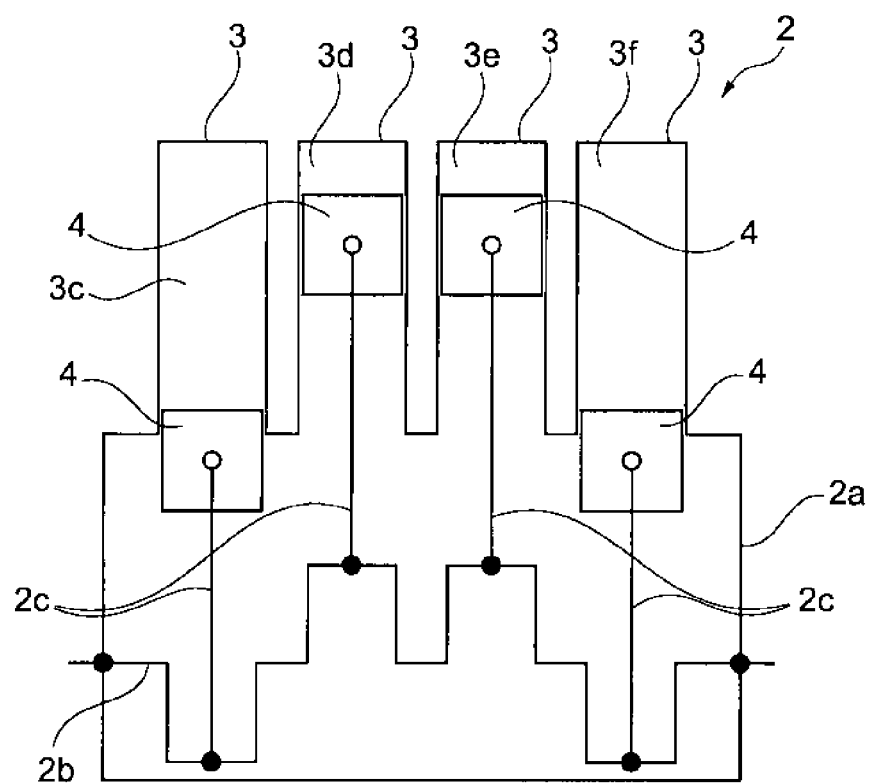
FIG. 16 shows a reciprocating-piston machine comprising four pistons.

FIG. 16 schematically shows a further exemplary embodiment of a reciprocating-piston machine 2 comprising a machine housing 2*a*, a common shaft 2*b* and a multiplicity of cylinders 3, which are fixed to the machine housing 2*a* and the pistons 4 of which are driven by the common shaft 2*b*, each via a piston rod 2*c*. In the exemplary embodiment represented the reciprocating-piston machine 2 comprises four cylinders 3*c*, 3*d*, 3*e*, 3*f*, the fluid-carrying connections and the valves not being represented in detail.

FIG. 17 by way of example schematically shows a possible fluid-carrying circuit of the reciprocating-piston machine 2 represented in FIG. 16, and fluid lines 21 together with a first, a second and a third cooler 22*a*,22*b*, 22*c*. Depending on the valves used and their actuation, for example as represented in FIG. 17, the four cylinders 3*c*, 3*d*, 3*e*, 3*f* can be operated in such a way that the first cylinder 3*c*, the second cylinder 3*d* and the third cylinder 3*e* are operated as compressor, each cylinder output being delivered via a fluid line 21 to a downstream cooler 22*a*, 22*b*, 22*c*, and that the fourth cylinder 3*f* is operated as expander, a fluid to be processed being delivered to a fluid inlet 21*a* and after expansion being discharged from the fluid outlet 21*b*. The method and the device according to the invention have the advantage that a reciprocating-piston machine 2 may comprise a plurality of pistons 4 and cylinders 3, at least two, with the facility for operating these cylinders 2 as compressor or as expander, depending on their particular actuation. Since all pistons 4 are actuated by a common crankshaft 2*b*, this affords the advantage that the energy delivered to the common crankshaft 2*b* by the piston operated as expander can be delivered via the crankshaft 2 directly to the piston 4 operated as compressor. The arrangement represented moreover has the advantage that through a corresponding actuation of the valves each of the cylinders 3 can be operated either as compressor or as expander, it being possible to determine, preferably for each cylinder 3 individually and independently of the other cylinders, whether this is operated as a compressor or as an expander.

The invention claimed is:

1. A method for expanding a compressed gas (GD) at a gas pressure (pD) with a reciprocating-piston machine, wherein the reciprocating-piston machine comprises a piston capable of moving to and fro and a working chamber delimited by the moveable piston, the compressed gas (GD) being delivered to the working chamber via an actuatable rotary slide valve, and the compressed (GD) present in the working chamber being expanded in the working chamber,
   wherein the rotary slide valve is closed, and a pressure differential prevailing over the closed rotary slide valve is reduced by compressing a gas residual quantity (GR) in the working chamber, and the rotary slide valve is opened when the pressure differential has been reduced, and
   wherein for controlling delivery the rotary slide valve is closed prematurely at a first valve closing angle (P'4), at which there is only a partial gas expansion quantity (GTE) present in the working chamber which is less than a maximum possible gas expansion quantity (GE-MAX).

2. The method as claimed in claim 1, wherein gas is discharged from the working chamber via a second valve, and that the second valve is closed at a second valve closing angle (P2) at which the gas residual quantity (GR) is present in the working chamber.

3. The method as claimed in claim 1, wherein the rotary slide valve is closed after the top dead center (P3) at a first valve closing angle (P4) at which a gas expansion quantity (GE) is present in the working chamber, that the gas expansion quantity (GE) is then expanded in the working chamber, so that the gas has an expansion gas pressure (pE), and that the expansion gas pressure (pE) prevailing in the working chamber in the area of the bottom dead center (P1) with the second valve closed is determined through at least one of the parameters: first valve closing angle (P4) and gas expansion quantity (GE).

4. The method as claimed in claim 2, wherein the second valve closing angle (P2) is selected in such a way that the differential pressure prevailing over the closed rotary slide valve in the area of the top dead center (P3) is minimized.

5. The method as claimed in claim 2, wherein the first valve closing angle (P4) is selected in such a way that the differential pressure prevailing over the closed, second valve in the area of a bottom dead center (P1) is minimized.

6. The method as claimed in claim 4, wherein the rotary slide valve is opened when in the area of the top dead center (P3) there is substantially no differential pressure.

7. The method as claimed in claim 5, wherein the second valve is opened when in the area of the bottom dead center (P1) there is substantially no differential pressure.

8. The method as claimed in claim 2, wherein the second valve closing angle (P2) is selected in such a way that with the rotary slide valve closed the gas residual quantity (GR) in the working chamber has a gas pressure in the area of a top dead center (P3) which exceeds the gas pressure (pD) of the compressed gas GD).

9. The method as claimed in claim 3, wherein an outlet pressure (pA) prevails at the outlet of the second valve, and that the first valve closing angle (P4) is selected in such a way that with the second valve closed the gas expansion quantity (GE) in the area of a top dead center (P1) has an expansion gas pressure (pE) which is less than the outlet pressure (pA).

10. The method as claimed in claim 8, wherein the rotary slide valve and/or the second valve comprises a valve seat having a port and a closing element for closing the port, and that the closing element of the rotary slide valve is automatically lifted relative to the valve seat in the area of the top dead center (P3) due to the gas pressure of the gas residual quantity (GR) and/or that the closing element of the second valve is automatically lifted relative to the valve seat in the area of the bottom dead center (P1) due to the gas pressure of the gas expansion quantity (GE).

11. The method as claimed in claim 10, wherein the second valve is designed as a second rotary slide valve, that after automatically lifting from the valve seat the closing element of the rotary slide valve and/or of the second rotary slide valve is controllably rotated in order to expose the port.

12. The method as claimed in claim 2, wherein the rotary slide valve and/or the second valve is positively opened and/or closed.

13. The method as claimed in claim 2, wherein a process parameter setting (VS) of the rotary slide valve is predefined, that the second valve closing angle (P2) is varied during successive lift cycles and a process parameter actual value (VI) of the first valve is measured as a function of the second valve closing angle (P2), that the second valve closing angle (P2) at which the process parameter actual value (VI) lies closest to the process parameter setting (VS) is defined as a second valve set closing angle (P2*Soll*), and that the second valve is controllably closed at the second valve set closing angle P2*Soll*).

14. The method as claimed in claim 1, wherein the compressed gas (GD) is expanded by at least two reciprocating-piston machines connected in series, by expanding the compressed gas (GD) at gas pressure (pD) to a first expansion gas pressure (PE1) in a first reciprocating-piston machine (2*a*), and by expanding the gas (G) at the first expansion gas pressure (PE1) to a second expansion gas pressure (PE2) in a second reciprocating-piston machine (2*b*).

15. The method as claimed in claim 1, wherein for controlling the delivery the second valve is closed prematurely at a second valve closing angle (P'2), at which there is an excess gas quantity (GRZ) present in the working chamber which exceeds the gas expansion quantity (GE).

16. The method for expanding and for compressing a gas (G) with a reciprocating piston machine, the gas (G) being compressed by the reciprocating piston machine to form a compressed gas (GD) at gas pressure (pD), and the compressed gas (GD) being expanded by a method as claimed in claim 1.

17. The method as claimed in claim 16, wherein the reciprocating-piston machine comprises a double-acting piston, which divides the internal chamber into a first internal chamber and a second internal chamber, a rotary valve and a second valve being assigned to each internal chamber, and that simultaneously the gas is compressed to form the compressed gas (GD) in the first internal chamber, and the compressed gas (GD) is expanded in the second internal chamber.

18. The method as claimed in claim 16, wherein the reciprocating-piston machine is operated continuously, and that in the continuous operation the reciprocating-piston machine is operated as a reciprocating-piston expander and/or as a reciprocating-piston compressor through a corresponding actuation of the rotary slide valve and the second valve.

19. A device for expanding a compressed gas (GD), comprising a reciprocating-piston machine, wherein the reciprocating-piston machine comprises a piston capable of moving to and fro and a working chamber delimited by the moveable piston, and comprising an actuatable rotary slide valve and an actuatable second valve, and comprising an actuating device for actuating the rotary slide valve and the second valve, wherein the compressed gas (GD) is delivered to the working chamber via the rotary slide valve, and wherein the compressed gas (GD) present in the working chamber can be expanded in the working chamber, wherein the expanded gas present in the working chamber can be discharged via the second valve, wherein the actuating device already actively closes the second valve before a top dead center (P3) is reached, in order to compress a gas residual quantity (GR) present in the working chamber up to the top dead center (P3), and thereby to reduce the pressure differential (DD) prevailing on the rotary slide valve in the area of the top dead center (P3).

20. The reciprocating-piston machine as claimed in claim 19, wherein the rotary slide valve and the actuatable second valve is designed as a rotary slide valve comprising a closing element and a valve seat, wherein the closing element is rotatably arranged and is driven by an operating drive (15).

21. The reciprocating-piston machine as claimed in claim 20, wherein the closing element is supported so that it is automatically moveable perpendicularly to the valve seat, so that the closing element lies against the valve seat or if lifted in relation the valve seat, as a function of the pressure differential acting on the rotary slide valve.

* * * * *